(12) United States Patent
Reponen

(10) Patent No.: US 7,934,169 B2
(45) Date of Patent: Apr. 26, 2011

(54) GRAPHICAL USER INTERFACE, ELECTRONIC DEVICE, METHOD AND COMPUTER PROGRAM THAT USES SLIDERS FOR USER INPUT

(75) Inventor: Erika Reponen, Tampere (FI)

(73) Assignee: Nokia Corporation, Espoo (FI)

( * ) Notice: Subject to any disclaimer, the term of this patent is extended or adjusted under 35 U.S.C. 154(b) by 514 days.

(21) Appl. No.: 11/339,968

(22) Filed: Jan. 25, 2006

(65) Prior Publication Data

US 2007/0192744 A1 Aug. 16, 2007

(51) Int. Cl.
*G06F 3/048* (2006.01)

(52) U.S. Cl. .......................... 715/833; 715/784

(58) Field of Classification Search ........................ None
See application file for complete search history.

(56) References Cited

U.S. PATENT DOCUMENTS

| | | | | |
|---|---|---|---|---|
| 5,491,781 A | * | 2/1996 | Gasperina | 715/786 |
| 5,553,225 A | | 9/1996 | Perry | 395/157 |
| 5,655,094 A | * | 8/1997 | Cline et al. | 715/786 |
| 5,874,961 A | | 2/1999 | Bates et al. | 345/341 |
| 5,923,861 A | | 7/1999 | Bertram et al. | 395/341 |
| 6,407,749 B1 | * | 6/2002 | Duke | 345/684 |
| 7,215,302 B2 | * | 5/2007 | Satoh et al. | 345/7 |
| 2002/0063737 A1 | * | 5/2002 | Feig et al. | 345/786 |
| 2002/0080151 A1 | | 6/2002 | Venolia | 345/660 |
| 2002/0093496 A1 | * | 7/2002 | Gould | 345/204 |
| 2003/0016248 A1 | * | 1/2003 | Hayes Ubillos | 345/800 |
| 2005/0212823 A1 | * | 9/2005 | Uthe et al. | 345/660 |
| 2008/0034316 A1 | * | 2/2008 | Thoresson | 715/781 |

FOREIGN PATENT DOCUMENTS

CA 2351907 A1 * 1/2002

OTHER PUBLICATIONS

IBM TDB, NN9608151, "Zoom-Scale Using Conventional Scroll Bars", Aug. 1, 1996, vol. 39, Issue No. 8, pp. 151-152.*
Cahill, LM. et al, "Sizeable Scroll Bar Box for Text Display" IBM Technical Disclosure Bulletin, Apr. 1, 1994, vol. 37, No. 04A, p. 635-636 (IP.com Electronic Publication: Mar. 26, 2005).

* cited by examiner

*Primary Examiner* — Pierre M Vital
*Assistant Examiner* — Rachel J Lee
(74) *Attorney, Agent, or Firm* — Harrington & Smith

(57) ABSTRACT

A graphical user interface including a first slider having a first widget that is movable by a user along a first track and a second slider, integrated within the first widget, wherein the second slider has a second widget that is movable by a user along a second track.

26 Claims, 6 Drawing Sheets

GRAPHICAL USER INTERFACE, ELECTRONIC DEVICE, METHOD AND COMPUTER PROGRAM THAT USES SLIDERS FOR USER INPUT

FIELD OF THE INVENTION

Embodiments of the present invention relate to a graphical user interface, electronic device, method and computer program that uses sliders for user input.

BACKGROUND TO THE INVENTION

The use of sliders in graphical user interfaces is well established. A slider typically comprises a widget that is moved by a user along a track, which may or may not be visible. One common use of a slider in a GUI is as a scroll bar.

The position of the widget within its track determines the content displayed and moving the widget within its track scrolls the content through the display.

The use of a zoom function or a re-size function in GUIs is also well established. Typically the zoom function is available via a menu, hot key, drop-down option or similar. It is therefore difficult to scroll and re-size simultaneously or in very quick succession.

When zoom is used in a GUI that uses a scroll bar the relative size of the widget within its trace changes with the zoom factor. The size of the widget relative to the total length of its track indicates the size of the displayed content relative to the total available content U.S. Pat. No. 5,553,225 describes a GUI in which the user can change the size of the widget by dragging an edge of the widget and thereby change the zoom factor. Although this mechanism co-locates a mechanism for scrolling and a mechanism for zooming, it has a number of disadvantages. The mechanism is only appropriate to zooming and scrolling and does not have wider application. The mechanism does not allow simultaneous scrolling and zooming. The mechanism would be difficult to use as the direction in which an edge of the widget is dragged to perform a zoom is the same as the direction in which the widget is dragged to perform a scroll, it would therefore be extremely easy to perform a scroll when one intended to perform a zoom and visa versa.

BRIEF DESCRIPTION OF THE INVENTION

It would therefore be desirable to provide an improved GUI that uses a slider.

According to one embodiment of the invention there is provided an electronic device comprising: a display; a user input device; and a processor for controlling the display to display a first slider comprising a first widget that is movable by a user using the user input device along a first track to control the output of the device in a first manner and a second slider comprising a second widget that is movable by a user using the user input device along a second track to control the output of the device in a second manner different to the first manner, wherein the second slider is integrated within the first widget.

According to another embodiment of the invention there is provided a method of controlling a display for user input, comprising: controlling a display to display a first slider comprising a first widget that is movable by a user along a first track to control the output of the device in a first manner; and controlling the display to simultaneously display a second slider comprising a second widget that is movable by a user along a second track to control the output of the device in a second manner different to the first manner, characterized in that the second slider is integrated within the first widget.

According to another embodiment of the invention there is provided a computer program comprising instructions which when loaded into a processor enable the processor to: control a display to display a first slider comprising a first widget that is movable by a user along a first track to control the output of the device in a first manner and to simultaneously display a second slider, integrated within the first widget, wherein the second slider comprises a second widget that is movable by a user along a second track to control the output of the device in a second manner different to the first manner.

According to another embodiment of the invention there is provided a graphical user interface comprising a first slider having a first widget that is movable by a user along a first track and a second slider, integrated within the first widget, wherein the second slider has a second widget that is movable by a user along a second track.

The integration of the second slider in the widget of the first slider results in a user having easier access to the first and second manners of control.

The use of two independently operable sliders allows the use of the GUI in a wide range of applications. It may for example be used to control not only the scrolling and the zoom factor of content but alternatively the brightness and contrast of an image or the volume and tone of music.

The use of two independently operable sliders with distinct tracks that are offset at an angle from each other allows the first and second manners of control to be performed simultaneously. A user action may be resolved into both a movement of the first widget along the first track and also a simultaneous movement of the second widget along the second track.

The use of two independently operable sliders means it is extremely easy to perform the first manner of control without performing the second manner of control and visa versa.

BRIEF DESCRIPTION OF THE DRAWINGS

For a better understanding of the present invention reference will now be made by way of example only to the accompanying drawings in which.

DETAILED DESCRIPTION OF EMBODIMENTS OF THE INVENTION

Figure 1:
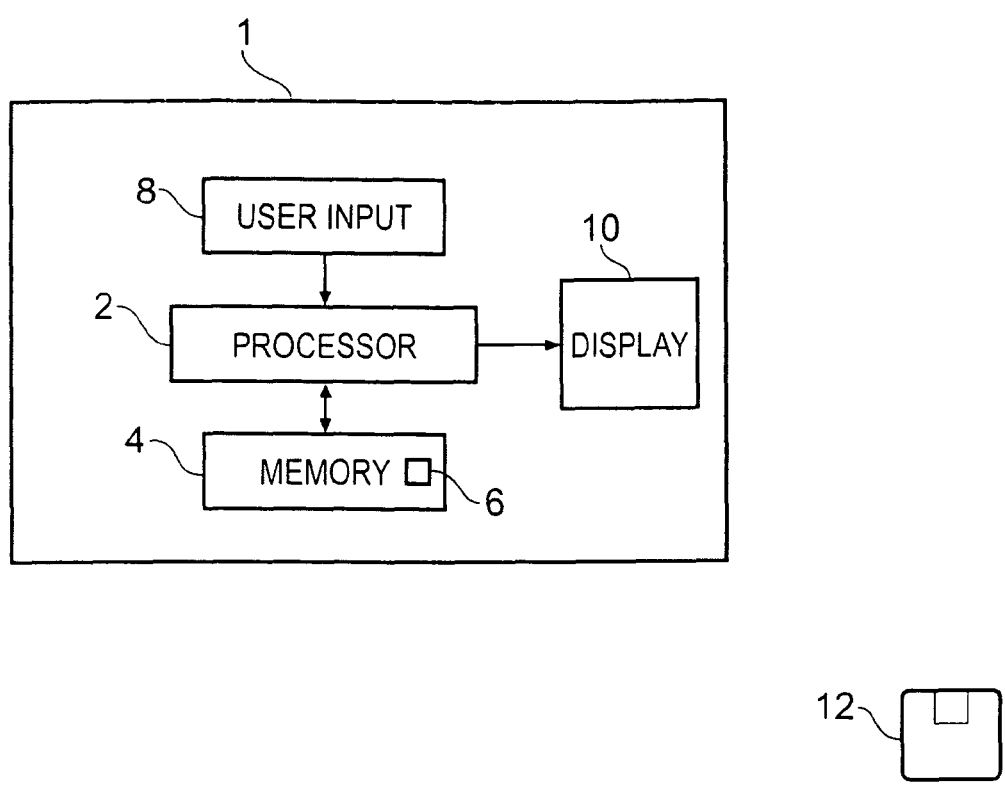
FIG. 1 schematically illustrates an electronic device.

The Figures illustrate an electronic device 1 comprising: a display 10; a user input device 8; and a processor 2 for controlling the display 10 to display a first slider 20 comprising a first widget 22 that is movable by a user using the user input device along a first track 21 to control the output of the device in a first manner (scrolling) and a second slider 30 comprising a second widget 32 that is movable by a user using the user input device 8 along a second track 31 to control the output of the device in a second manner (re-sizing) different to the first manner, wherein the second slider 30 is integrated within the first widget 22.

FIG. 1 is a schematic illustration of an electronic device 1. The electronic device may be, for example, a computer, a personal digital assistant, a mobile telephone, a music player, a consumer electronic device etc.

The electronic device 1 comprises a processor 2, a memory 4 that stores computer program instructions 6, a user input device 8, and a display 10. Only as many components are illustrated as is necessary to describe the operation of the electronic device 1. It should, however, be understood that additional or functionally equivalent components may be used.

The processor 2 is arranged to read from and write to the memory 4. It also provides an output to the display 10 that controls what is displayed by the display 10 and receives input from the user input device 8.

The user input device 8 may be any suitable form of input. It may be, for example, a keypad, a joystick, a mouse, a trackball, voice command recognition, a touch screen etc. Typically the user input device cooperates with the display to provide a graphical user interface 3. For example, the user input device may be operable to move a cursor within the display and perform a selection at the location of the cursor.

The memory 4 stores computer program instructions 6 that control the operation of the electronic device 1 when loaded into the processor 2. The computer program instructions 6 provide the logic and routines that enables the electronic device 1 to perform the methods illustrated in FIGS. 6A, 6B and 6C and to produce the GUIs 3 illustrated in FIGS. 2A-5B.

The computer program instructions may arrive at the electronic device 1 via an electromagnetic carrier signal or be copied from a physical entity 12 such as a computer program product, a memory device or a record medium such as a CD-ROM or DVD.

The electronic device 1 provides a graphical user interface (GUI) 3 via its display 10 as illustrated in FIGS. 2A-2C, 3A, 4A-4C, 5A-5B.

The GUI 3 presents content 5 to a user in the display 10. In the illustrated examples, the content 5 is schematically illustrated as a series of labeled non-overlapping circles. However, it should be understood that the content may be any appropriate content such as images, text, drawings etc.

The GUI 3 comprises a vertical scroll-bar 20 at the rightmost edge of the display area and a horizontal scroll-bar 40 at the lowermost edge of the display area.

The vertical scroll bar is a first slider 20 and is for scrolling the content 5 vertically. The first slider 20 comprises a first track 21 and a first widget 22 that is movable by a user along the first track 21 using the user input device 8.

A horizontal re-size bar is a second slider 30 and is for re-sizing content 5 is also illustrated. The second slider 30 comprises a second track 31 and a second widget 32 that is movable by a user along the second track 31 using the user input device 8 to control the value of a re-size factor R.

The horizontal scroll bar is a third slider 40 and is for scrolling content 5 horizontally. The third slider 40 comprises a third track 41 and a third widget 42 that is movable by a user along the third track 41 using the user input device 8.

In the examples illustrated in FIGS. 2A, 2B, 2C and 5A, the second slider 30 is an integral part of the first widget 22.

Figure 2A:
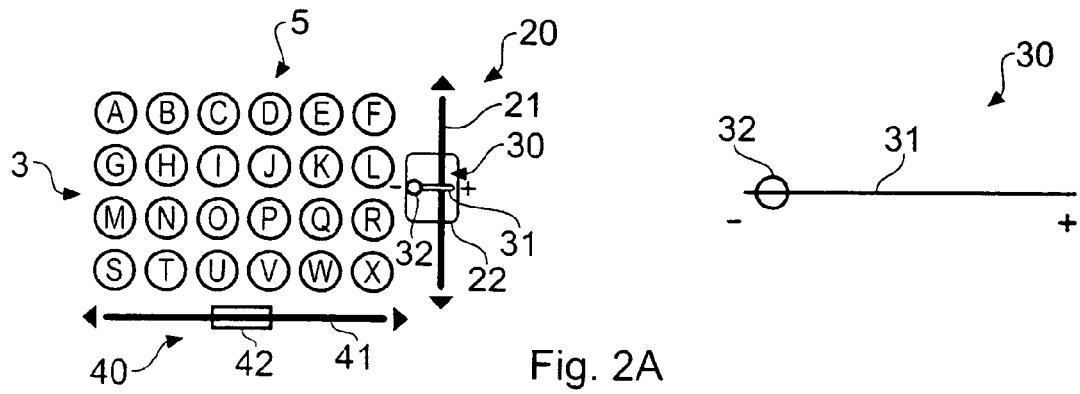
FIGS. 2A-2C illustrate a GUI in which a second horizontal slider for re-sizing is integrated within a first widget of a first vertical slider for scrolling.
Figure 2B:
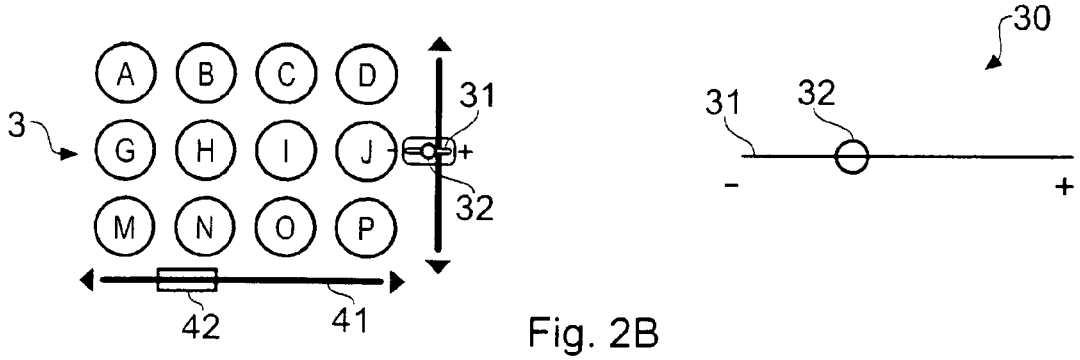
Figure 2C:
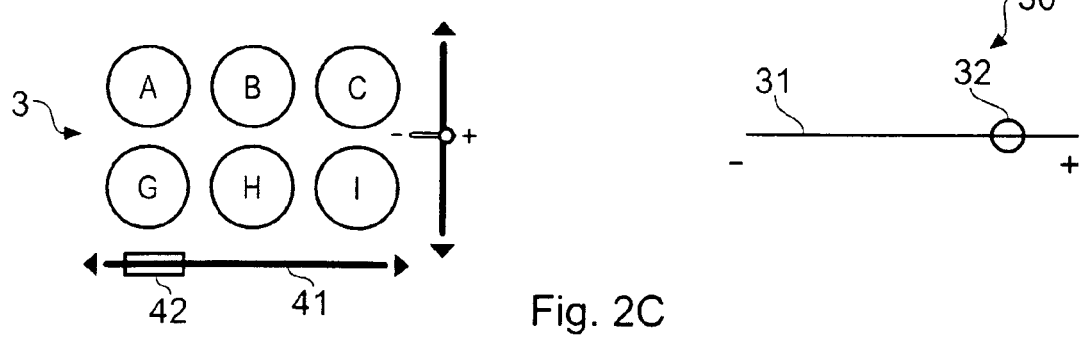

In FIGS. 2A-2C, the second track 31 is straight and extends horizontally, at ninety degrees, to the straight vertical first track 21. As the first widget 22 is moved along the first track 21 during vertical scrolling, the second 're-size' slider 30 moves with the first widget 22 so that access to the re-size function is easily available.

In FIGS. 2A, 2B and 2C the second slider 20 is illustrated at a larger scale to the right hand side of the figures.

In FIG. 2A, there is minimum zoom and the second widget 32 is to the extreme left of the second track 31. The lengthwise size of the first widget 22, i.e. the amount by which the first widget 22 extends along the first track 21, and the widthwise size of the third widget 42, i.e. the amount by which the third widget 42 extends along the third track 41 are dependent upon the re-size factor R. As FIG. 2A illustrates minimum zoom i.e. minimum re-size factor R the lengthwise size of the first widget and the widthwise size of the third widget are maximum.

In FIG. 2B, there is intermediate zoom and the second widget 32 is approximately mid-way along the second track 31. The lengthwise size of the first widget 22, and the widthwise size of the third widget 42 are less than in FIG. 2A.

In FIG. 2C, there is maximum zoom and the second widget 32 is towards the extreme right of the second track 31. The lengthwise size of the first widget 22, and the widthwise size of the third widget 42 are less than in FIG. 2B.

Although re-sizing of the first widget 22 and the third widget 42 is illustrated this is an optional feature.

In the examples illustrated in FIGS. 3A, 4A, 4B, 4C, the second slider 30 is an integral part of the third widget 42.

In FIGS. 3A, 4A, 4B, 4C, the second track 30 is straight and extends vertically, at ninety degrees, to the straight horizontal third track 41. As the third widget 42 is moved along the third track 41 during horizontal scrolling, the second slider 30 moves with the third widget 42 so that access to the re-size function is easily available.

Figure 3A:
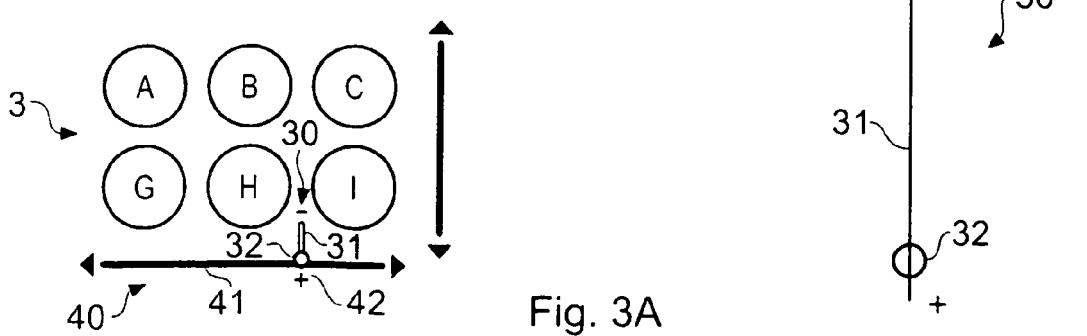
FIG. 3A illustrates a GUI in which a second vertical slider for re-sizing is integrated within a third widget of a third horizontal slider for scrolling.
Figure 4A:
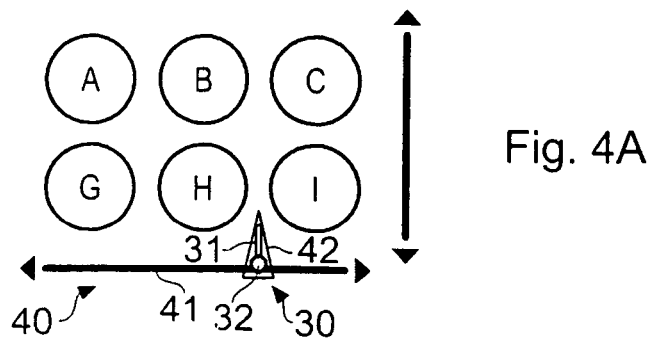
FIGS. 4A, 4B and 4C illustrate GUIs in which a second vertical slider for re-sizing is integrated within a third widget of a third horizontal slider for scrolling.
Figure 4B:
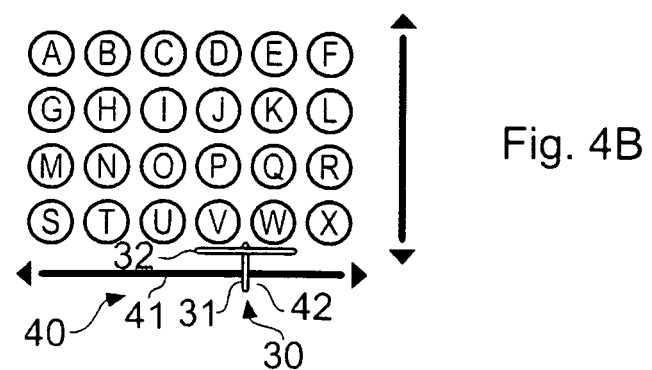
Figure 4C:
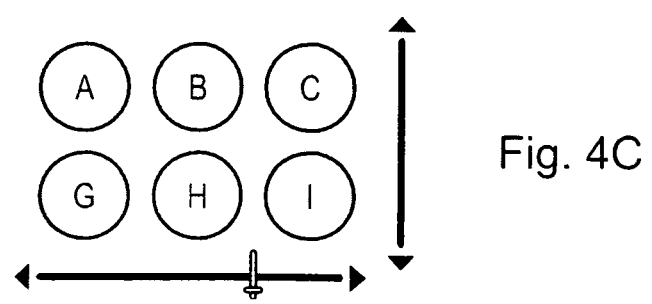

FIGS. 3A, 4A, 4B, 4C illustrate different implementations of the third widget 42 with integrated second slider 30. In FIG. 3A, third widget 42 is the second slider 30 and visa versa. In FIG. 4A, the third widget 42 is a an isosceles triangle with first and second apexes positioned on the third track 41 and the third apex positioned at one extremity of the second track 31 that bi-sects the triangle. The other extremity of the second track 31 terminates at the third track 41. The widthwise length of the triangular third widget 42 is the distance between the first and second apexes of the triangle. In FIGS. 4A and 4C the third widget 42 is the second slider 30 and visa versa. The widthwise length of the triangular third widget 42 is the widthwise length of the second widget 32.

Movement of the second widget 32 up and down the second track re-sizes the content 5 in a manner similar to that illustrated in FIGS. 2A-2C. The sizes of the first widget 22 and the third widget 42 may change as the resize factor R changes on moving the second widget 32 along the second track 31. Although the tracks illustrated in FIGS. 2A-4C are straight this is not essential. In particular the second track 31 may be curved or otherwise non-rectilinear. The tracks may be visible or invisible.

Figure 5A:
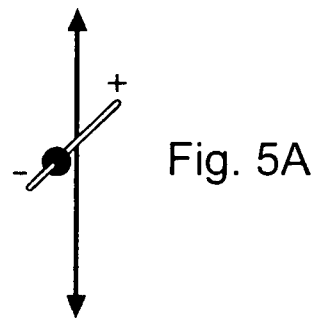
FIGS. 5A and 5B illustrate three dimensional GUIs in which a second slider for re-sizing is integrated within a widget of a slider for scrolling.
Figure 5B:
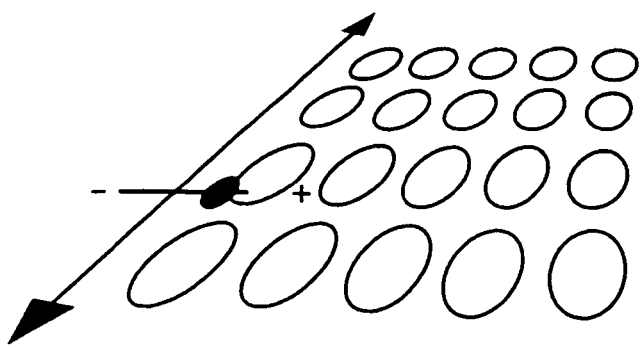

The GUIs illustrated in FIGS. 2A-4C are two dimensional (2D). The second track 32 runs at ninety degrees to the first track 21 where they cross and also runs at ninety degrees to the third track 41 where they cross. FIGS. 5A and 5B illustrate a three dimensional (3D) GUI 3. The GUI 3 is designed to provide a feeling of depth by the use of perspective. In FIG. 5A, the second track 32 does not run at ninety degrees to the first track 21 where they cross but runs at an angle that in the 3D perspective of the GUI makes the second track 32 appear to run at ninety degrees to the first track where they cross. In FIG. 5B, the third track is in the z dimension as opposed to the x dimension. The second track 32 does not run at ninety degrees to the third track 41 where they cross but runs at an angle that in the 3D perspective of the GUI makes the second track 32 appear to run at ninety degrees to the third track where they cross.

Scrolling and Re-sizing

Let the content 5 have a length CL and a width CW, the display 10 have a length DL and a width DW, the first track 21 have a length L1, the third track 41 have a length L2 and the re-size factor be designated by R.

If an active point is positioned at (X,Y) in the content, the portion of content that is displayed has a length DL/R and a width DW/R. It starts at (X-a, Y-b) and ends at (X-a+DW/R, Y-b+DL/R) where a and b depend upon the position of the active point in or relative to the display.

Vertical scrolling changes the value of b. Scrolling up increases b and scrolling down decreases b. Horizontal scrolling changes the value of a. Scrolling left increases a and scrolling right decreases a The active point is, for example, the text entry point or the central image point. It may be determined by a user, for example by selecting a point in the display 10 using the user input device 8, or may be determined automatically.

The fractional position of the centre of the first widget 22 along the first track 21 is given by $y_c=(Y-b+DL/2R)/CL$. The fractional position of the upper edge of the first widget 22 along the first track 21 is given by $y_u=(Y-b)/CL$. The fractional position of the lower edge of the first widget 22 along the first track 21 is given by $y_l=(Y-b+DL/R)/CL$. The first widget has a length between its upper and lower edges of $DL*L1/(R*CL)$.

The fractional position of the centre of the third widget along the third track is given by $x_c=(X-a+DW/2R)/CW$. The fractional position of the left edge of the third widget 42 along the third track 41 is given by $x_l=(X-a)/CW$. The fractional position of the right edge of the third widget 42 along the third track 41 is given by $x_r=(X-a+DW/R)/CW$. The third widget 42 has a length between its left and right edges of $DW*L2/(R*CW)$.

The displayed content consequently starts at $(CW*x_l, CL*y_u)$ and ends at $(CW*x_l+DW/R, CL*y_u+DL/R)$.

Horizontal scrolling changes $x_l$ but does not change R and vertical scrolling changes $y_u$ but not R.

Resizing may be effected by changing R. A zoom-in makes R larger and a zoom-out makes R smaller. The value of R is dependent upon the position of the second widget 32 along the second track 31.

Figure 6A:
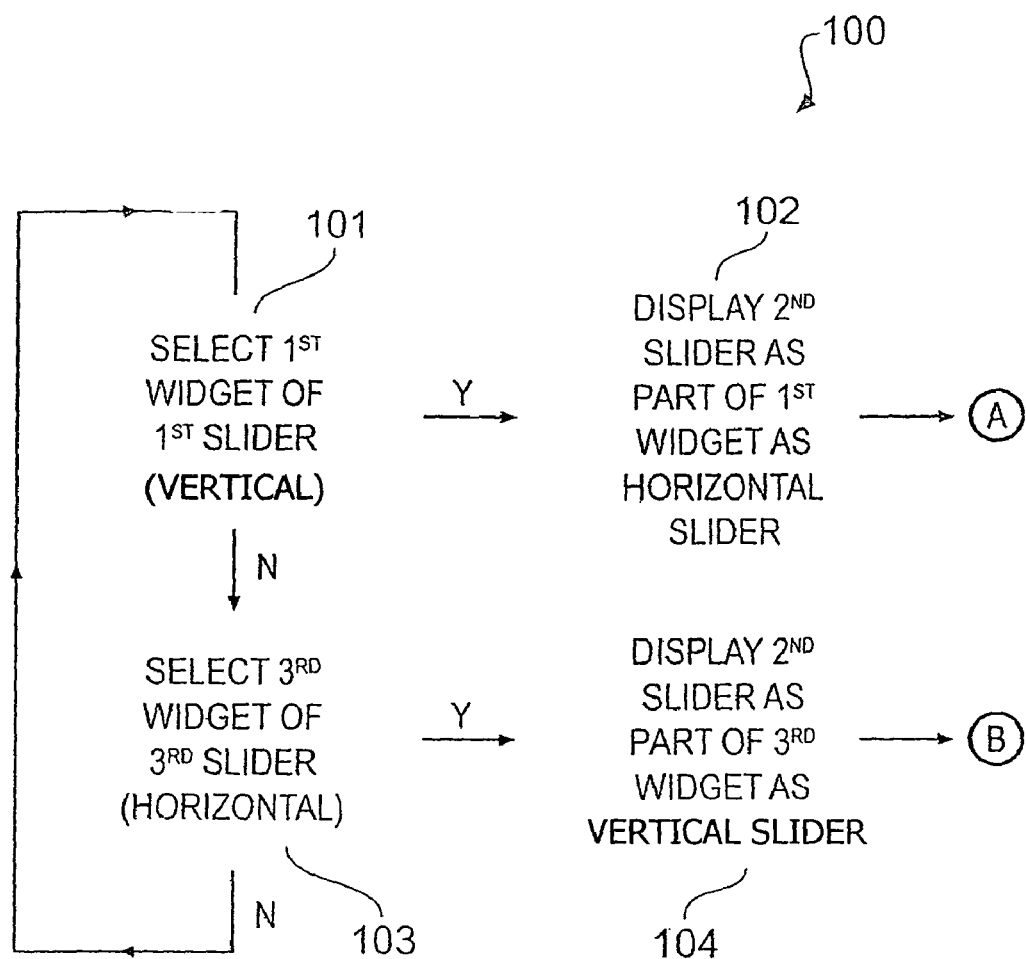
FIGS. 6A, 6B and 6C illustrate a process for scrolling and/or re-sizing displayed content.
Figure 6B:
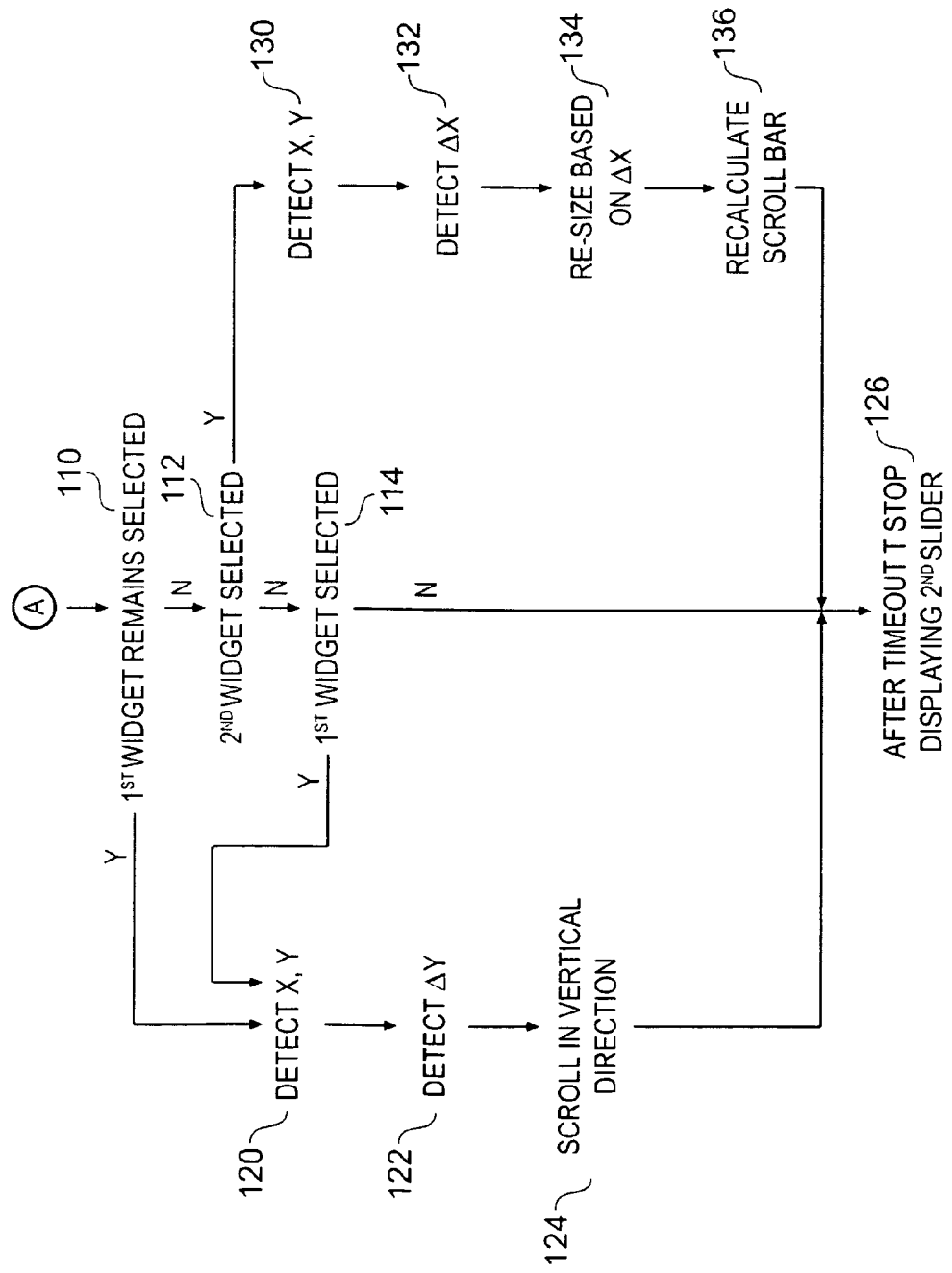
Figure 6C:
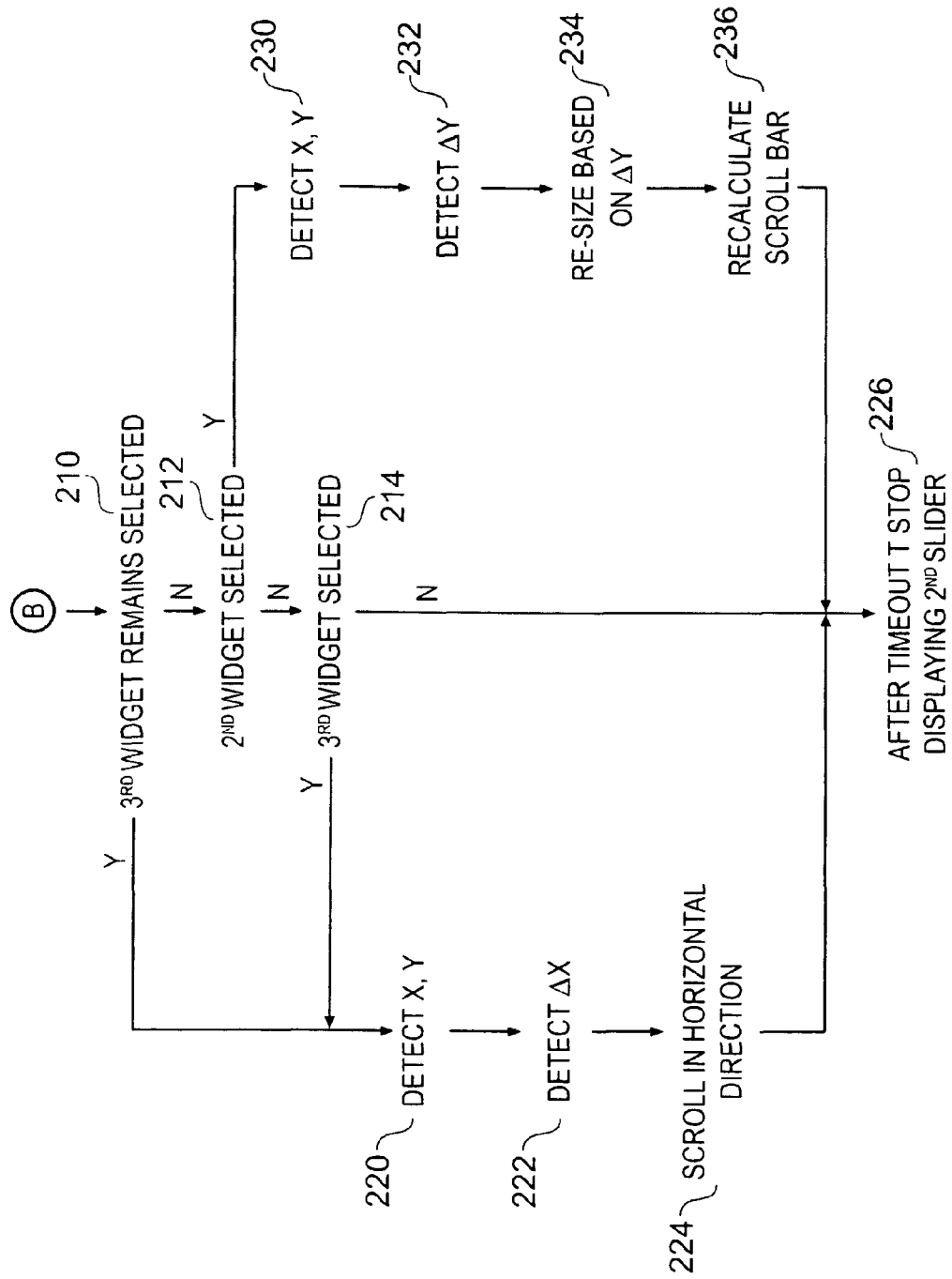

The process 100 of scrolling and/or resizing is illustrated in FIGS. 6A, 6B and 6C. The active position (X, Y) in the content is set either manually or automatically.

At step 101, the process 100 determines whether the user is selecting the first widget 22 of the vertical slider 20. If the user is selecting the first widget 22 the process branches to step 102 and if the user is not selecting the first widget 22 the process moves to step 103.

At step 103, the process 100 determines whether the user is selecting the third widget 42 of the horizontal slider 40. If the user is selecting the third widget 42, the process branches to step 104 and if the user is not selecting the third widget 42 the process returns to step 101.

At step 102, the second slider 30 is displayed as an integral part of the first movable widget 22 of the first slider 20. FIGS. 2A, 2B, 2C illustrate the second slider 30 as an integral part of the first widget 22. The second slider 30 has a second widget 32 that is movable by a user along a second track 31. In this example, the second track 31 is straight and horizontal and is orthogonal to the straight vertical first track 21.

At step 104, the second slider 30 is displayed as an integral part of the third movable widget 42 of the third slider 40. FIGS. 3A, 4A, 4B, 4C illustrate the second slider 30 as an integral part of the third widget 42. The second slider 30 has a second widget 32 that is movable by a user along a second track 31. In this example, the second track 31 is straight and vertical and is orthogonal to the straight horizontal third track 41.

After step 102, the process moves to step 110 in FIG. 6B. At step 110, it is determined whether or not the first widget 22 remains selected by a user. If it does, the process branches to step 120 which is the start of a vertical scrolling process. If it does not the process continues to step 112.

At step 112, it is determined whether or not the second widget 32 is being selected by a user. If it has been selected, the process branches to step 130 which is the start of a re-sizing process. If it has not been selected the process continues to step 114.

At step 114, it is determined whether or not the first widget 22 is being selected by a user. This will occur if after display of the second slider 30 a user selects a portion of the first widget 22 other than the second widget 32.

If the first widget 22 has been selected, the process branches to step 120 which is the start of a vertical scrolling process. If it has not been selected the process continues to step 126 where, after a timeout of T seconds, the second slider 20 is no longer displayed. The second slider 20 is thus only displayed when it is required. In an alternative embodiment, the second slider may be permanently displayed as part of the first widget 22.

At step 120, the position $y_u$ of the upper edge of the first widget 22 in the first track 21 is determined and position $x_l$ of the left edge of the third widget 42 in the third track 41 is determined. Then at step 122 the process detects a change $\Delta y$ in the original position $y_u$ as the user moves the first widget 22 along the first track 21. Then at step 124, the process calculates the new content for display and displays it. The displayed content starts at $(CW*x_l, CL*(y_u+\Delta y))$ and ends at $(CW*x_l+DW/R, CL*(y_u+\Delta y)+DL/R)$. The process then moves to step 126.

At step 130, the position $y_u$ of the upper edge of the first widget 22 in the first track 21 is determined and position $x_l$ of the left edge of the third widget 42 in the third track 41 is determined. The position of the second widget 32 in the second track 31 is also detected.

Then at step 132, the process detects a change $\Delta x$ in the original position of the second widget 32 along the second track 31 and varies R in proportion to $R+\Delta R$. Then at step 134, the process calculates the new content for display and displays it. The displayed content starts at $(CW*x_l, CL*y_u)$ and ends at $(CW*x_l+DW/(R+\Delta R), CL*(y_u+\Delta y)+DL/(R+\Delta R))$.

Then at step 136 the process calculates changes to the first and third sliders, if any, and updates the display.

The fractional position of the centre of the first widget 22 along the first track 21 is given by $y_c=(Y-b+DL/(2(R+\Delta R)))/CL)$. The fractional position of the upper edge of the first widget 22 along the first track 21 is unchanged but the first widget has a length between its upper and lower edges of $DL*L1/((R+\Delta R)*CL)$.

The fractional position of the centre of the third widget along the third track is given by $x_c=(X-a+DW/(2*(R+\Delta R))/CW$. The fractional position of the left edge of the third widget 42 along the third track 41 is unchanged but the third widget 42 has a length between its left and right edges of $DW*L2/((R+\Delta R)*CW)$.

The process then moves to step 126.

After step 104, the process moves to step 210 in FIG. 6C. At step 210, it is determined whether or not the third widget 42 remains selected by a user. If it does, the process branches to step 220 which is the start of a horizontal scrolling process. If it does not the process continues to step 212.

At step 212, it is determined whether or not the second widget 32 is being selected by a user. If it has been selected, the process branches to step 230 which is the start of a re-sizing process. If it has not been selected the process continues to step 214.

At step 214, it is determined whether or not the third widget 42 is being selected by a user. This will occur if after display of the second slider 30 a user selects a portion of the third widget 42 other than the second widget 32.

If the third widget 42 has been selected, the process branches to step 220 which is the start of a horizontal scrolling process. If it has not been selected the process continues to step 226 where, after a timeout of T seconds, the second slider 20 is no longer displayed.

At step 220, the position $y_u$ of the upper edge of the first widget 22 in the first track 21 is determined and position $x_l$ of the left edge of the third widget 42 in the third track 41 is determined. Then at step 122 the process detects a change $\Delta x$ in the original position $x_l$ as the user moves the third widget 42 along the third track 41. Then at step 224, the process calculates the new content for display and displays it. The displayed content starts at (CW*($x_l$+$\Delta x$), CL*$y_u$) and ends at (CW*($x_l$+$\Delta x$)+DW/R, CL*$y_u$+DL/R). The process then moves to step 226.

At step 230, the position y u of the upper edge of the first widget 22 in the first track 21 is determined and the position $x_l$ of the left edge of the third widget 42 in the third track 41 is determined. The position of the second widget 32 in the second track 31 is also detected.

Then at step 232, the process detects a change $\Delta y$ in the original position of the second widget 32 along the second track 31 and varies R in proportion to R+$\Delta$R. Then at step 234, the process calculates the new content for display and displays it. The displayed content starts at (CW*$x_l$, CL*$y_u$) and ends at (CW*$x_l$+DW/(R+$\Delta$R), CL*($y_u$+$\Delta y$)+DL/(R+$\Delta$R)).

Then at step 336 the process calculates changes to the first and third sliders, if any, and updates the display.

The fractional position of the centre of the first widget 22 along the first track 21 is given by $y_c$=(Y-b+DL/(2(R+$\Delta$R)))/CL). The fractional position of the upper edge of the first widget 22 along the first track 21 is unchanged but the first widget has a length between its upper and lower edges of DL*L1/((R+$\Delta$R)*CL).

The fractional position of the centre of the third widget along the third track is given by $x_c$=(X-a+DW/(2*(R+$\Delta$R))/CW. The fractional position of the left edge of the third widget 42 along the third track 41 is unchanged but the third widget 42 has a length between its left and right edges of DW*L2/((R+$\Delta$R)*CW).

The process then moves to step 226.

In the preceding described embodiments, when the second slider 30 is integrated within the first widget 22, and the second widget 32 is selected for example using a cursor then, the movement of the cursor may be constrained to follow only the second track 31 or, alternatively, the component of movement of the cursor that is parallel to the second track 31 will be converted into movement of the second cursor 32 along the second track 31 whereas the component of the movement of the cursor parallel to the first track 21 will have no effect.

In the preceding described embodiments, when the second slider 30 is integrated within the first widget 22, and the first widget 22 (but not the second widget 32) is selected for example using a cursor then, the movement of the cursor may be constrained to the first track 21 or alternatively the component of movement of the cursor that is parallel to the first track 21 will be converted into movement of the first cursor 22 along the first track 21 whereas the component of the movement of the cursor parallel to the second track 31 will have no effect.

In an alternative embodiment, when the second slider 30 is integrated within the first widget 22, and the first widget 22 (but not the second widget 32) is selected for example using a cursor then, the movement of the cursor may be unconstrained and the component of movement of the cursor that is parallel to the first track 21 will be converted into movement of the first cursor 22 along the first track 21 and the component of movement of the cursor that is parallel to the second track 31 will be converted into movement of the second cursor 32 along the second track 31.

Although the preceding embodiments have described an implementation of the invention in which the display is controlled by the first slider 20 and the third slider 40 in a first scrolling manner and in which the display is controlled by the second slider 30 in a second re-sizing manner, alternative combinations of manners of control are possible.

For example, the first, second and third sliders may be used to control the display in different navigation/scrolling manners. The first and third sliders may be used for navigation in two orthogonal directions that lie in a common two dimensional plane (i.e. lengthwise and widthwise scrolling directions) and the second slider when it is displayed as a part of the first widget and/or when it is displayed as part of the third widget may be used for navigation in a third direction that is orthogonal to the two dimensional plane (i.e. a depth wise scrolling direction). Thus a two dimensional GUI is provided for three dimensional navigation.

As another example, the first slider may be used to control brightness of an image and the second slider that is integrated into the first widget 22, may be used to control contrast of the image. If a third dimension is present, a slider in that dimension may be used to, for example, control color saturation. For example, the first slider may be used to control volume of a sound reproduction and the second slider that is integrated into the first widget 22, may be used to control tone of the sound reproduction. If a third dimension is present, a slider in that dimension may be used to, for example, control bass tone.

Although embodiments of the present invention have been described in the preceding paragraphs with reference to various examples, it should be appreciated that modifications to the examples given can be made without departing from the scope of the invention as claimed.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus comprising:
   a display;
   a user input device;
   at least one processor; and
   at least one memory including computer program code;
   the at least one memory and the computer program code configured to, with the at least one processor, cause the apparatus at least to control the display to display a first slider comprising a first widget that is movable by a user using the user input device along a first track to control the output of the device, wherein the first slider is a scrolling slider configured to scroll content within the display, and only one second slider comprising only one second widget that is movable by a user using the user input device along a second track to control the output of the apparatus, wherein the second slider is a zoom slider configured to resize content within the display, and the second slider is integrated within the first widget, such that the second slider moves with the first widget and said second track is integrated within said first widget, wherein the first track is different than the second track and the first track is orthogonal to the second track and wherein said first and second tracks are displayed, the apparatus further comprising a third slider wherein the third slider comprises a third widget that is movable by a user using the user input device along a third track and wherein the second slider is integrated within the first widget, but not the third widget, when the first slider is in use and wherein the second slider is integrated within the third widget, but not the first widget, when the third slider is in use, and wherein the first slider is a scrolling slider configured to scroll content within the display in a first direction and the third slider is a scrolling slider configured to scroll content within the display in a second direction, orthogonal to the first direction.

2. An apparatus as claimed in claim 1, wherein the first track and the second track cross but are otherwise distinct.

3. An apparatus as claimed in claim 1, wherein the first track and the second track cross but are otherwise distinct when the first slider is in use and the second track and the third track cross but are otherwise distinct when the third slider is in use.

4. An apparatus as claimed in claim 3, wherein the first track and the third track are straight lines at a fixed angle.

5. An apparatus as claimed in claim 1, wherein the first track and the second track are straight lines at a first fixed angle when the first slider is in use.

6. An apparatus as claimed in claim 1, wherein the third track and the second track are straight lines at a second fixed angle when the third slider is in use.

7. An apparatus as claimed in claim 1, wherein the first slider performs only a scrolling function in a first direction.

8. An apparatus as claimed in claim 1, wherein the third slider performs only a scrolling function in a second direction.

9. An apparatus as claimed in claim 1, wherein to move the first widget, the user first selects an area of first widget that does not include the second widget and then drags the area.

10. An apparatus as claimed in claim 9, wherein dragging of the selected area is constrained to be along the first track.

11. An apparatus as claimed in claim 9, wherein dragging of the selected area is unconstrained and the first widget moves to a position on the first track aligned with the position of the selected area.

12. An apparatus as claimed in claim 9, wherein movement of cursor after selection is resolved into movement of the first widget along the first track and movement of the second widget along the second track.

13. An apparatus as claimed in claim 1, wherein to move the second widget, the user first selects an area of the second widget.

14. An apparatus as claimed in claim 12, wherein dragging of the selected area is constrained to be along the second track.

15. An apparatus as claimed in claim 12, wherein dragging of the selected area is unconstrained and the second widget moves to a position on the second track aligned with the position of the selected area.

16. A method comprising:
with a processor, controlling a display to display:
a first slider comprising a first widget that is movable by a user using a user input device along a first track to control the output of the device, wherein the first slider is a scrolling slider configured to scroll content within the display, and only one second slider comprising only one second widget that is movable by a user using the user input device along a second track to control the output of the device, wherein the second slider is a zoom slider configured to resize content within the display, wherein the second slider is integrated within the first widget, such that the second slider moves with the first widget and said second track is integrated within said first widget, wherein the first track is different than the second track and the first track is orthogonal to the second track and wherein said first and second tracks are displayed, and a third slider wherein the third slider comprises a third widget that is movable by a user using the user input device along a third track and wherein the second slider is integrated within the first widget, but not the third widget, when the first slider is in use and wherein the second slider is integrated within the third widget, but not the first widget, when the third slider is in use, and wherein the first slider is a scrolling slider configured to scroll content within the display in a first direction and the third slider is a scrolling slider configured to scroll content within the display in a second direction, orthogonal to the first direction.

17. A physical entity tangibly embodying a computer program comprising instructions that are executed by a processor for performing the method of claim 16.

18. A physical entity embodying a computer program providing the logic and routines that enables a processor to:
control a display to display
a first slider comprising a first widget that is movable by a user along a first track to control the output of the device, wherein the first slider is a scrolling slider configured to scroll content within the display and to simultaneously display only one second slider, integrated within the first widget, wherein the second slider comprises only one second widget that is movable by a user along a second track to control the output of the device, wherein the second slider is a zoom slider configured to resize content within the display, such that the second slider moves with the first widget and said second track is integrated within said first widget, wherein the first track is different than the second track and the first track is orthogonal to the second track and wherein said first and second tracks are displayed, and a third slider wherein the third slider comprises a third widget that is movable by a user using the user input device along a third track and wherein the second slider is integrated within the first widget, but not the third widget, when the first slider is in use and wherein the second slider is integrated within the third widget, but not the first widget, when the third slider is in use, and wherein the first slider is a scrolling slider configured to scroll content within the display in a first direction and the third slider is a scrolling slider configured to scroll content within the display in a second direction, orthogonal to the first direction.

19. A physical entity embodying a graphical user interface comprising:
   a first slider having a first widget that is movable by a user along a first track, wherein the first slider is a scrolling slider configured to control content within a display, and
   only one second slider, integrated within the first widget, wherein the second slider is a zoom slider configured to resize content within the display and the second slider has only one second widget that is movable by a user along a second track, such that the second slider moves with the first widget and said second track is integrated within said first widget, wherein the first track is different than the second track and the first track is orthogonal to the second track, and wherein said first and second tracks are displayed, and
   a third slider wherein the third slider comprises a third widget that is movable by a user using the user input device along a third track and wherein the second slider is integrated within the first widget, but not the third widget, when the first slider is in use and wherein the second slider is integrated within the third widget, but not the first widget, when the third slider is in use, and wherein the first slider is a scrolling slider configured to scroll content within the display in a first direction and the third slider is a scrolling slider configured to scroll content within the display in a second direction, orthogonal to the first direction.

20. An apparatus as claimed in claim 1, wherein the first track is longer than the second track.

21. An apparatus as claimed in claim 1, wherein the size of the first widget is dependent on the position of the second widget.

22. A physical entity embodying a computer program as claimed in claim 18, wherein the first slider controls the content in the display in the first manner and the second slider controls the content in the display in the second, different manner.

23. An apparatus as claimed in claim 1, wherein the display displays an image having a first length in a first direction and a second length in a second direction, wherein the processor is further configured to zoom to a portion of the image wherein the portion of the image has a third length in the first direction and a fourth length in the second direction, wherein the second slider is a zoom slider for resizing content within the display and the second slider controls simultaneously both the third length and the fourth length of the portion of the image.

24. A method as claimed in claim 16, further comprising controlling the display to display an image having a first length in a first direction and a second length in a second direction and;
   controlling the display to zoom to a portion of the image wherein the portion of the image has a third length in the first direction and a fourth length in the second direction, wherein the second slider is a zoom slider for resizing content within the display and the second slider controls simultaneously both the third length and the fourth length of the portion of the image.

25. A physical entity embodying a computer program as claimed in claim 18, wherein the display displays an image having a first length in a first direction and a second length in a second direction, wherein the processor is further configured to zoom to a portion of the image wherein the portion of the image has a third length in the first direction and a fourth length in the second direction, wherein the second slider is a zoom slider for resizing content within the display and the second slider controls simultaneously both the third length and the fourth length of the portion of the image.

26. A physical entity embodying a graphical user interface as claimed in claim 19, wherein a display displays an image having a first length in a first direction and a second length in a second direction, wherein the processor is further configured to zoom to a portion of the image wherein the portion of the image has a third length in the first direction and a fourth length in the second direction, wherein the second slider is a zoom slider for resizing content within the display and the second slider controls simultaneously both the third length and the fourth length of the portion of the image.

* * * * *